United States Patent
Jiao et al.

(10) Patent No.: US 8,150,556 B2
(45) Date of Patent: Apr. 3, 2012

(54) METHOD OF COORDINATED OPERATION FOR TURBINE-GENERATOR SHAFTS TORSIONAL VIBRATION PROTECTION

(75) Inventors: Shaohua Jiao, Beijing (CN); Tao Zhang, Beijing (CN); Quan Liu, Beijing (CN); Xinyan Liang, Beijing (CN); Yuansheng Li, Beijing (CN)

(73) Assignee: Beijing Sifang Automation Co., Ltd., Beijing (CN)

( * ) Notice: Subject to any disclaimer, the term of this patent is extended or adjusted under 35 U.S.C. 154(b) by 109 days.

(21) Appl. No.: 12/529,645

(22) PCT Filed: Apr. 30, 2008

(86) PCT No.: PCT/CN2008/000892
§ 371 (c)(1),
(2), (4) Date: Apr. 30, 2008

(87) PCT Pub. No.: WO2009/089670
PCT Pub. Date: Jul. 23, 2009

(65) Prior Publication Data
US 2010/0286837 A1    Nov. 11, 2010

(30) Foreign Application Priority Data
Jan. 17, 2008    (CN) .......................... 2008 1 0056351

(51) Int. Cl.
G05D 3/12      (2006.01)
F03D 11/00     (2006.01)
H02P 9/00      (2006.01)
H02P 9/14      (2006.01)
H02P 9/04      (2006.01)

(52) U.S. Cl. ............ 700/292; 415/119; 322/14; 322/44; 322/78

(58) Field of Classification Search .................. 700/292; 415/119; 322/14, 44, 78
See application file for complete search history.

(56) References Cited

U.S. PATENT DOCUMENTS
3,999,115 A  * 12/1976 South et al. ...................... 322/25
(Continued)

FOREIGN PATENT DOCUMENTS
CN            101247048           8/2008
(Continued)

OTHER PUBLICATIONS

Celal et al., "High-Performance ac/dc Converter for High-Frequency Power Distribution Systems: Analysis, Design Considerations, and Experimental Results", IEEE, 1994. p. 275-280.*

(Continued)

Primary Examiner — Albert Decady
Assistant Examiner — Thomas Stevens
(74) Attorney, Agent, or Firm — Matthew J. Booth & Associates, PLLC; Matthew J. Booth

(57) ABSTRACT

The present invention relates to the coordinated control method of torsional stress relay in large thermal power plants' generators (300 MW and above), which will be adopted when shaft torsional oscillations occur. This invention also publishes a method of realizing selective trip the generators and the trip criterions which are implemented by the torsional stress relay and coordinated control master station (Tmaster). Tmaster will real-time monitor the operating status of the generators and TSR, TMaster will also real-time generate a trip priority level sequencing by analyzing the unit output. When generators occur subsynchronous resonance and shaft torsional oscillation, this method can ensure that TSR will trip some generators of the power plant according to the real-time generated trip strategy to inhibit the shaft torsional oscillation and safeguard the units. This method can also avoid the tremendous economic loss caused by tripping all the generators, and that will reduce the hazard to the transmission grid.

3 Claims, 2 Drawing Sheets

U.S. PATENT DOCUMENTS

| | | | | |
|---|---|---|---|---|
| 4,080,559 | A | * | 3/1978 | Wright et al. .................. 322/58 |
| 4,282,756 | A | * | 8/1981 | Molnar et al. .................. 73/650 |
| 4,329,637 | A | * | 5/1982 | Kotake et al. .................. 322/20 |
| 4,377,780 | A | * | 3/1983 | Bjorklund ....................... 322/29 |
| 4,454,428 | A | * | 6/1984 | Kimmel et al. ............. 290/40 R |
| 7,423,411 | B2 | * | 9/2008 | Sihler ............................. 322/19 |
| 7,884,581 | B2 | * | 2/2011 | Markunas et al. ............. 322/44 |

FOREIGN PATENT DOCUMENTS

| | | | |
|---|---|---|---|
| JP | 05341094 | A | 12/1993 |
| JP | 2000060003 | A | 2/2000 |
| JP | 2000292252 | A | 10/2000 |
| JP | 2001333533 | A | 11/2001 |
| WO | 2009/089670 | A1 | 7/2009 |

OTHER PUBLICATIONS

Baker et al., "Subsynchronous Resonance Studies and Mitigation Methods for Series Capacitor Applications", 2005, IEEE, p. 386-392.*

Joyce et al., "Torsonial Fatigue of Turbine-Generator Shafts Caused by Different Electrical System Faults and Switching Operations", IEEE, 1978, p. 1965-1977.*

* cited by examiner

METHOD OF COORDINATED OPERATION FOR TURBINE-GENERATOR SHAFTS TORSIONAL VIBRATION PROTECTION

FIELD OF THE INVENTION

This invention is related to the field of power system, large thermal power plant, and industries which need steam turbine-generators, especially the coordinated control method of Torsional Stress Relays.

BACKGROUND OF THE INVENTION

With the construction of the ultra high voltage transmission grid, transmission technology of bulk power and long distance has been widely applied in China. In order to solve the problem existed in improving the transmission ability of large capacity unit, the technology of series capacitor compensation (including controllable series capacitor compensation, TCSC) has been largely applied. Otherwise, HVDC Transmission technology has been utilized in regional transmission grids to solve the stability problem of the large transmission grid, and that will form an AC-DC mixed transmission mode. Because of the application of these two advanced technology in power transmission networks, subsynchronous resonance occurs as a new hazard that will do harm to the grid and impact the security of power plants proper operation. According to the problem of subsynchronous resonance, we can utilize the subsynchronous damping control or blocking filter to increase SSR severity, but the largest hazard of subsynchronous resonance is the critical damage it brings to the large capacity unit's shaft. Because the inherent frequency of the turbo-unit is similar with the resonant frequency of the transmission grid, the grid's subsynchronous resonance will cause torsional oscillation on the turbo-unit's shaft, if the resonance damping of the grid is not enough (or to be negative), the grid will occur divergent subsynchronous resonance, that will cause the torsional oscillations to be divergent too, and the shaft will be broken into parts. This kind of accident will also bring huge loss, no matter the personal injuries or the equipment damages, to the stability of the regional network.

At present, the turbo-unit of regional network that has the possibility to have subsynchronous resonance should be applied with torsional stress relay (TSR) and real-time system to monitor the torsional oscillation of the shaft. When the mechanical fatigue reaches the fixed value or the torsional oscillation is in divergence form, TSR will trip the unit from the network, to safeguard the normal operation of the units.

The generators in large capacity power plant are always the same type (e.g. 4×600 MW units 8×600 MW units), and the same type units have the same mode shapes, if the subsynchronous resonance was occurred in operation process, situation of different generators torsional oscillations will be the same. When the subsynchronous resonance occurs, if all the generators were equipped with TSR and all the shafts fatigue reached the predetermined levels, the trip output contacts will be provided simultaneously. To lose numerous high-capacity generators at the same time will do great harm to the regional transmission networks. The present invention proposes the coordinated control principle of TSR in different units. This invention also provides the method to optimize the output of TSR by coordinate master station, and reduces the impact of tripping the generator breaker on transmission networks.

SUMMARY OF THE INVENTION

In order to prevent the simultaneous protection trip of the same type generators when subsynchronous resonance occurs, the present invention utilizes the following technical scheme to implement the coordination control of TSR in different units.

Content of the technical scheme as follow:

The present invention provides a coordinated control method of turbine generators in large power plant. The method's purpose is to implement a coordinated control group composed by each unit's TSR in one power plant; this group can be divided into 2 layers, torsional stress relay (TSR) and the torsional stress relay and coordinated control master station (namely Tmaster). TSR implements the unit's torsional oscillation monitoring and shaft fatigue real-time calculation independently, TSR also judges whether the trip command should be sent according to the predetermined criterions and fixed value. TMaster provides real-time monitoring of each unit's operating status and output. TMaster also provides online real-time optimized strategy that makes TSR and TMaster's coordinated operation implement the selective trip.

This method includes:

1) Each unit's TSR will send 2 input signals to TMaster, one represents whether the TSR provides the trip output, the other represents whether the shaft torsional oscillation mode is divergent. After TMaster receives the trip signal, it will trip the units according to the real-time calculated optimization strategy.

2) When TMaster first receives the TSR trip signal, it will trip the unit which has the highest priority, then hold for a period (we define it as "Tset", set the value in 0.5S~1S) to wait for the signal represents whether the shaft torsional oscillation mode is in divergence form.

3) If there're any units shaft torsional oscillation mode is still divergent, TMaster will trip the unit which has the highest priority, then hold for Tset period to judge whether there is any units left that its shaft torsional oscillation mode is still divergent.

4) If there're some units still left divergent, TMaster will keep the unit which has the lowest priority running, and trip all the other units which are divergent.

The present invention utilizes the TSR and TMaster to protect the units when torsional oscillation occurs. This invention also avoids the situation that all the units or most of the units are tripped when each TSR trips separately. The present invention reduces great economic loss for the power plant, An example, a 600 MW unit will cost millions of RMB to restart a tripped turbine generator, otherwise, the loss of the unit output during the generators are tripped is huge, if the security level of transmission network is improved, it will bring great social benefit and economic benefit.

DESCRIPTION OF THE PREFERRED EMBODIMENTS

Figure 1:
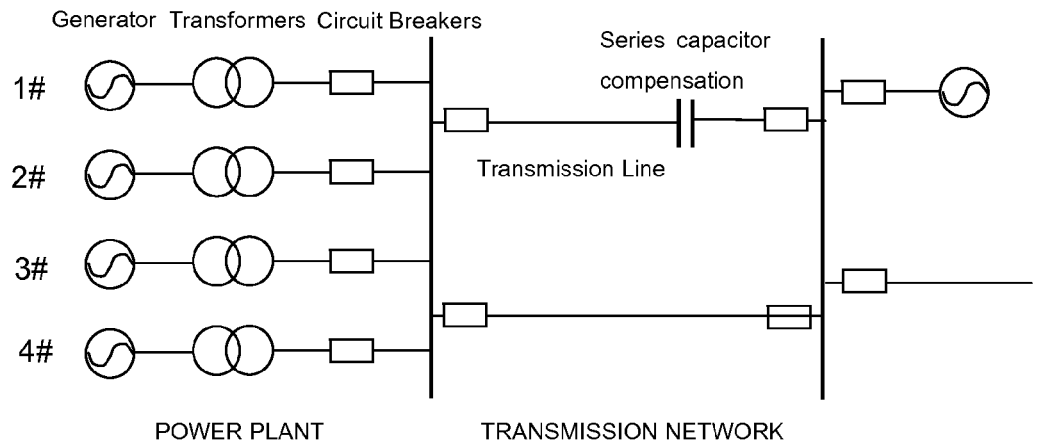
FIG. 1 shows a system's structure, it shows a power plant composed of 4 same type generators sends its output to the transmission network through a long-distance transmission line with series capacitor.
Figure 2:
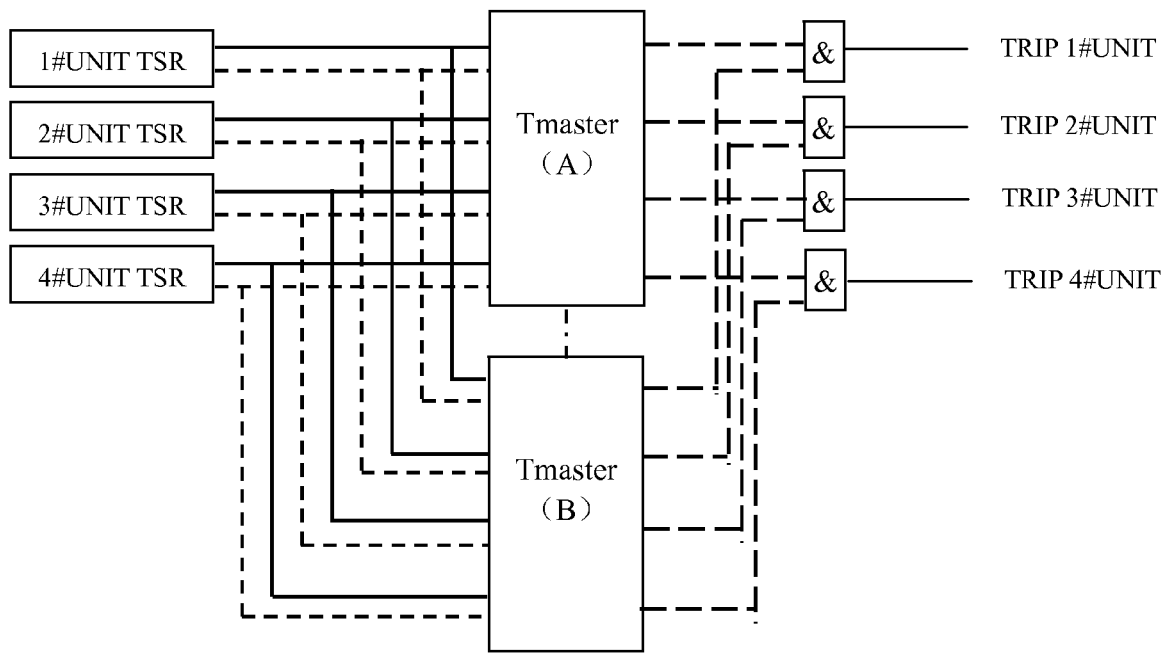
FIG. 2 shows a system's wiring diagram, it represents the TSR of a power plant composed by 4 units implement the optimized trip by a couple of TMaster.
Figure 3:
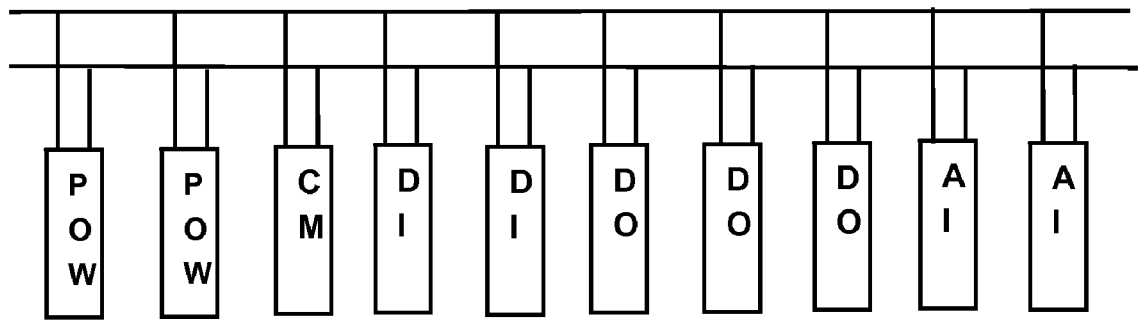
FIG. 3 shows the TMaster hardware block diagram

The following paragraphs provide a further introduction of the invention's technical scheme according to the attached figures and cases.

The coordinated control method of TSR in large power plant mentioned in this invention, the method's purpose is to implement a coordinated control group composed by each unit's TSR in one power plant; this group can be divided into 2 layers, TSR and TMaster. TSR implements the unit's torsional oscillation monitoring and shaft fatigue real-time calculation independently, TSR also judges whether the trip command should be sent according to the predetermined criterions and fixed value. TMaster provides real-time monitoring of each unit's operating status and output. TMaster also provides online real-time optimization strategy that implements TSR and TMaster's coordinated operation to utilize the selective trip. The coordinated control group and coordinated control method will be introduced in the following paragraphs:

Coordinated control group:

The Coordinated control group is composed of each generator's torsional oscillation protection system in one power plant, and it can be divided into two layers: TSR and TMaster. TSR implements the unit's torsional oscillation monitoring independently, TMaster provides real-time monitoring of each unit's operating status and output. TMaster also provides online real-time optimization strategy that makes TSR and TMaster's coordinated operation to implement the protection trip.

Coordinated control method and its steps:

To trip the units by TSR can change the subsynchronous resonance electric parameters of transmission network, increases the subsynchronous damping, accelerate the subsynchronous resonance convergence's speed. To trip the units with the lowest output first can reduces the impact on the transmission network.

The coordinated control method steps are as follows:

1) Each generator's TSR will send 2 messages to the coordinated control master station (Tmaster), these messages are: "trip" command, unit's shaft torsional oscillation mode is in divergence form or not. When Tmaster receives the"trip" command form TSR, it will trip the units according to the real-time generated optimized trip strategy.
2) After Tmaster receives the first "trip" command, it will trip a unit which has the highest priority and wait for the message of the shaft torsional oscillation mode during the period of "Tset". "Tset" is a fixed value of latency period, usually its value is 0.5S~1S;
3) if the torsional oscillation is still existed after Tmaster has tripped the 1st unit, Tmaster will trip another unit that has the highest priority of the left units, then it will judge whether the left units shaft torsional oscillation mode is in divergence form during the period of "Tset";
4) if the torsional oscillation is still existed after Tmaster has tripped the 2nd unit, Tmaster will keep the unit which has the lowest priority running, and switch off all the other units if their shaft torsional oscillation mode was in divergence form.

Tmaster will real-time monitor each unit's electrical variables (output or current) and check the units' operation status, its online real-time generated optimized trip strategy is as follows:

1) Coordinated control master station (Tmaster) implements the real-time monitoring of each unit's operating status, and it only generates the trip priority for those units which is operating.

2) Coordinated control master station (Tmaster) implements the real-time monitoring of each unit's output, those units whose output is low has the highest trip priority.

3) Coordinated control master station (Tmaster) can configure a unit to have the lowest priority manually by setting the control words.

TSR of each unit implements the supervisory works of the units' shaft torsional oscillation and shaft fatigue real-time calculation independently, TSR will also judge whether to send the "trip" command according to its criterions and fixed value.

Tmaster's structure is as follows:

Tmaster is composed of power supply module (POW), digital input module (DI), digital output module (DO), alternating current input module (AI) and control module (CM), these modules utilizes the real-time network to implement internal communications. CM is the master station of the network; the other modules are slave stations except the power module. The amount of the slave station can be configured flexibly. In order to improve the reliability of Tmaster, POW and CM all utilize the redundant configuration; CM implements the redundant configuration by utilizing the redundant communication.

For example, if a unit composed of 4 same type generators transmits to the network through a series compensated transmission line; the subsynchronous resonance which is caused by series capacitor will occur torsional oscillations on the shaft. In order to resolve of this problem, it is recommended to equip TSR on each generator. TSR is located in electronic equipments room. Tmaster and TSR communicate by optical communication networks. Tmaster will monitor each unit's operating status, each unit's output or current (Tmaster will select one of these 2 variables to monitor according to the actual situation), and Tmaster will sort the units into trip priority order according to the electrical variables it real-time monitors. Tmaster receives each unit's TSR signals, and judges whether to trip after the torsional oscillation occurs.

Tmaster utilize the dual configuration, only when 2 TSR both provide trip output signal, the units can be tripped.

When torsional oscillation occurs, TSR will implement the trip strategy in steps, first TSR will trip the unit that has the highest priority, because to trip this unit will make the minimum economic impact to the power plant, and reach the object of inhibiting the subsynchronous resonance. If the torsional oscillation disappears, Tmaster will stop tripping the units, otherwise it will continue to trip the $2^{nd}$ unit; and if the torsional oscillation isn't in divergence form, Tmaster will continue to trip the rest of the units, till there's only 1 unit left.

Figure 4:
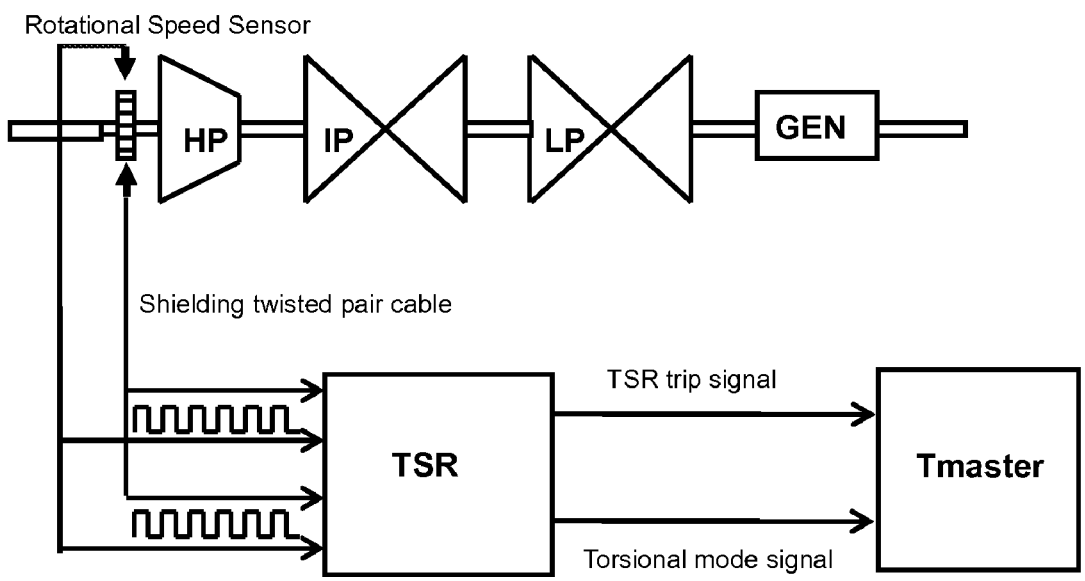
FIG. 4 shows the wiring diagram of TSR based on turbine generators shaft lumped mass model.

FIG. 4 shows the wiring diagram of TSR, the upper part of the diagram shows the shaft's lumped mass model, including the turbine generator's high-pressure chamber (HP), intermediate-pressure chamber (IP), low-pressure chamber (LP) and the generator. TSR receives the speed signal from the redundant shaft rotational speed sensors which are mounted on the head end of HP; TSR will calculate the shaft rotational speed change rate (dW) and analyze the torsional oscillation modes to judge whether the units should be tripped. TSR provides the trip signal and torsional oscillation mode signal to Tmaster, and Tmaster will trip the units according to the optimized strategy.

FIG. 4 shows the communication network of 4 units' TSR and Tmaster, including the redundant communication network which connects the different modules: power supply module (POW), control module (CM), digital input module (DI), digital output module (DO) and alternating current input module (AI), all the modules and their redundant network compose the TSR and Tmaster. In order to improve the stability level, the unit can be tripped only when 2 Tmaster provide the trip output signal simultaneously. Tmaster will utilize the trip strategy in steps when torsional oscillation occurs, first TSR will trip the unit that has the highest priority, because to trip this unit will make the minimum economic impact to the power plant, and reach the object of inhibiting the subsynchronous resonance. If the torsional oscillation disappears, Tmaster will stop tripping the units, otherwise it will continue to trip the $2^{nd}$ unit; and if the torsional oscillation wasn't in divergence form, Tmaster will continue to trip the rest of the units, till there's only 1 unit left.

The present invention utilizes the TSR and TMaster to protect the units when torsional oscillation occurs. This invention also avoids the situation that all the units or most of the units are tripped when each TSR trips separately. The present invention reduces great economic loss for the power plant, An example, a 600 MW unit will cost millions of RMB to restart a tripped turbine generator, otherwise, the loss of the unit output during the generators are tripped is huge, if the security level of transmission network is improved, it will bring great social benefit and economic benefit.

What is claimed is:

1. A coordinated control method of steam turbine generators' torsional stress relay (TSR) in large power plant, this method will connect TSR in different generators of the same power plant to form a coordinated control group, the coordinated control group can be divided into 2 layers: a TSR layer and a coordinated control master station (Tmaster) layer; each TSR implements a supervisory works of a units' shaft torsional oscillation and a shaft fatigue real-time calculation independently; TSR will judge whether to send a "trip" command according to its criterion and fixed value; Tmaster will implement a real-time monitoring of each generator's operation status and output, Tmaster can also real-time generate optimized trip strategy online, utilize a selective trip implemented by a coordinated action of equipments in 2 layers, this method includes:
   1) Each generator's TSR will send 2 messages to Tmaster, these messages are: "trip" command, unit's shaft torsional oscillation mode, when Tmaster receives the "trip" command form TSR, Tmaster will trip the units according to a real-time generated optimized trip strategy;
   2) After Tmaster receives a first "trip" command, it will trip a unit which has a highest priority, then wait for the message which represents a shaft torsional oscillation mode that is in divergence or not during a period of "Tset", where "Tset" is a fixed value of latency period, which usually is set as 0.5S~1S;
   3) If the shaft torsional oscillation still exists after Tmaster has tripped a first unit, Tmaster will trip another unit that has the highest priority of the remaining units, then TSR will judge whether the unit shaft torsional oscillation mode is in divergence during another period of "Tset";
   4) if the shaft torsional oscillation still exists after Tmaster has tripped a second unit, Tmaster will keep the unit which has a lowest priority running, and trip all other units if their shaft torsional oscillation mode is in divergence.

2. The method of claim 1, wherein said Tmaster will collect information of each unit's output and operation status, its online real-time generated optimized trip strategy is as follows:
   1) Tmaster implements the real-time monitoring of each unit's operating status, and it will only generate a trip priority for those units which are operating;
   2) Tmaster implements the real-time monitoring of each unit's output, and trips the units that have a lowest output first;
   3) Tmaster can be configured manually to let a unit have the lowest priority.

3. The method of claim 1, wherein said Tmaster will adopt dual configuration, the units can only be tripped when a second TSR provide protection output simultaneously.

* * * * *

UNITED STATES PATENT AND TRADEMARK OFFICE
CERTIFICATE OF CORRECTION

| | | |
|---|---|---|
| PATENT NO. | : 8,150,556 B2 | Page 1 of 1 |
| APPLICATION NO. | : 12/529645 | |
| DATED | : April 3, 2012 | |
| INVENTOR(S) | : Shaohua Jiao et al. | |

It is certified that error appears in the above-identified patent and that said Letters Patent is hereby corrected as shown below:

On title page, item (86), in "(§371 (c)(1), (2), (4) Date)", in column 1, line 1, delete "Apr. 30, 2008" and insert -- Sep. 2, 2009 --, therefor.

In column 6, line 2, in claim 1, delete "form" and insert -- from --, therefor.

In column 6, line 16, in claim 1, delete "if" and insert -- If --, therefor.

Signed and Sealed this
Fifteenth Day of May, 2012

David J. Kappos
*Director of the United States Patent and Trademark Office*